United States Patent
Tsuji

(10) Patent No.: US 10,896,350 B2
(45) Date of Patent: Jan. 19, 2021

(54) IMAGE PROCESSING APPARATUS, IMAGE PROCESSING METHOD, AND IMAGE CAPTURE APPARATUS

(71) Applicant: CANON KABUSHIKI KAISHA, Tokyo (JP)

(72) Inventor: Ryosuke Tsuji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/373,824

(22) Filed: Apr. 3, 2019

(65) Prior Publication Data
US 2019/0311217 A1    Oct. 10, 2019

(30) Foreign Application Priority Data

Apr. 10, 2018 (JP) ................................. 2018-075616
Mar. 22, 2019 (JP) ................................. 2019-055199

(51) Int. Cl.
*G06K 9/62* (2006.01)
*H04N 5/225* (2006.01)
(Continued)

(52) U.S. Cl.
CPC ........... *G06K 9/626* (2013.01); *G06K 9/6259* (2013.01); *H04N 5/2258* (2013.01); *H04N 5/23245* (2013.01)

(58) Field of Classification Search
CPC .. G06K 9/626; G06K 9/00248; G06K 9/6259; G06K 9/00986; G06K 9/4628;
(Continued)

(56) References Cited

U.S. PATENT DOCUMENTS

2005/0231628 A1* 10/2005 Kawaguchi ........ H04N 5/23219
                                                    348/345
2015/0042805 A1*  2/2015 Okumura ................ B60R 11/04
                                                    348/148
(Continued)

FOREIGN PATENT DOCUMENTS

JP    2005-318554 A    11/2005
JP    2008-204384 A     9/2008
(Continued)

OTHER PUBLICATIONS

Alex Krizhevsky, Ilya Sutskever, Geoffrey E. Hinton, "ImageNet Classification with Deep Convolutional Neural Networks", NIPS'12 Proceedings of the 25th International Conference on Neural Information Processing Systems—vol. 1, (2012) pp. 1097-1105, Cited in Specification in paragraphs [0003][0074].

(Continued)

*Primary Examiner* — Ahmed A Berhan
(74) *Attorney, Agent, or Firm* — Cowen, Liebowitz & Latman, P.C.

(57) ABSTRACT

An image processing apparatus that is capable of improving subject detection accuracy with respect to image signals is disclosed. The image processing apparatus applies subject detection processing to an image by using a learning model generated based on machine learning. The image processing apparatus selects the learning model from a plurality of learning models stored in advance, in accordance with characteristics of the image to which the subject detection processing is to be applied.

18 Claims, 7 Drawing Sheets

(51) Int. Cl.
  *H04N 5/232* (2006.01)
  *H04N 5/235* (2006.01)
  *G06K 9/00* (2006.01)
  *G06K 9/46* (2006.01)

(58) Field of Classification Search
  CPC ............. H04N 5/2258; H04N 5/23245; H04N 5/232122; H04N 5/2353; H04N 5/232
  See application file for complete search history.

(56) References Cited

U.S. PATENT DOCUMENTS

2018/0082152 A1\* 3/2018 Katz ...................... G06N 20/00
2019/0012525 A1\* 1/2019 Wang ..................... G06K 9/627

FOREIGN PATENT DOCUMENTS

| JP | 2014-041427 A | 3/2014 |
| JP | 2015-165377 A | 9/2015 |

OTHER PUBLICATIONS

The above foreign patent documents were cited in the Apr. 3, 2020 Japanese Office Action, without an English Translation, that issued in Japanese Patent Application No. 2019055199.

\* cited by examiner

IMAGE PROCESSING APPARATUS, IMAGE PROCESSING METHOD, AND IMAGE CAPTURE APPARATUS

BACKGROUND OF THE INVENTION

Field of the Invention

The present invention is related to an image processing apparatus, an image processing method, and an image capture apparatus, and is particularly related to a subject detection technique.

Description of the Related Art

Subject detection techniques for automatically detecting specific subject patterns from images are very useful. Japanese Patent Laid-Open No. 2005-318554 discloses an image capture apparatus that detects an area corresponding to a specific subject pattern, such as a person's face, from a captured image and optimizes the focus and exposure of the detected area.

Learning and recognition of subjects in images by using a technique called deep learning is known (Alex Krizhevsky, Ilya Sutskever, Geoffrey E. Hinton, "ImageNet classification with deep convolutional neural networks", NIPS'12 Proceedings of the 25th International Conference on Neural Information Processing Systems—Volume 1, PP. 1097-1105). A convolutional neural network (CNN) is one typical technology of deep learning. Generally, a CNN has a multilayer structure in which convolutional layers for spatially integrating features of local areas of an image, pooling layers or sub-sampling layers for compressing feature amounts in a spatial direction, and also a fully-connected layer, an output layer, etc., are combined. A CNN is capable of acquiring complex feature representations by performing feature replacement in multiple stages through the multilayer structure, and thus, is capable of performing, based on the feature representations, category recognition of subjects in images and subject detection in images with high accuracy.

If an apparatus is made to undergo machine learning, through supervised learning, a feature for detecting a subject in an image, the apparatus is provided with image signals for learning and supervisory signals paired with the image signals. Then, a learning model to be used for subject detection is generated as a result of the learning. An image signal obtained through shooting is influenced by optical system characteristics of an image capture apparatus, such as the sense of resolution, color tone, and blurring degree. Due to this, detection may fail if optical system characteristics differ between when the learning is performed and when subject detection using the learning result (learning model) is performed.

SUMMARY OF THE INVENTION

The present invention has been contrived in view of such a problem in prior art. To this end, the present invention provides an image processing apparatus, an image processing method, and an image capture apparatus that are capable of improving subject detection accuracy with respect to image signals.

According to one aspect of the present invention, there is provided an image processing apparatus comprising: one or more processors that execute a program stored in a memory and thus function as: a subject detection unit configured to apply subject detection processing to an image by using a learning model generated based on machine learning; and a selection unit configured to select, from learning models that are stored in a storage device for storing a plurality of learning models for use in the subject detection processing, a learning model to be used by the subject detection unit in accordance with characteristics of the image to which the subject detection processing is to be applied.

Further features of the present invention will become apparent from the following description of an exemplary embodiment with reference to the attached drawings.

DESCRIPTION OF THE EMBODIMENT

An exemplary embodiment of the present invention will now be described in detail in accordance with the accompanying drawings. Note that in the following embodiment, a description will be provided regarding a case in which the present invention is implemented as a digital single-lens reflex camera (DSLR). However, the present invention can be implemented as any electronic apparatus capable of handling image data, and the digital single-lens reflex camera is merely one example of the image processing apparatus according to the present invention. The present invention can be implemented as an electronic apparatus including, for example, a personal computer, smartphone, tablet terminal, game console, robot, etc. However, the present invention is not limited to these electronic apparatuses.

Configuration of Image Capture Apparatus

Figure 1:
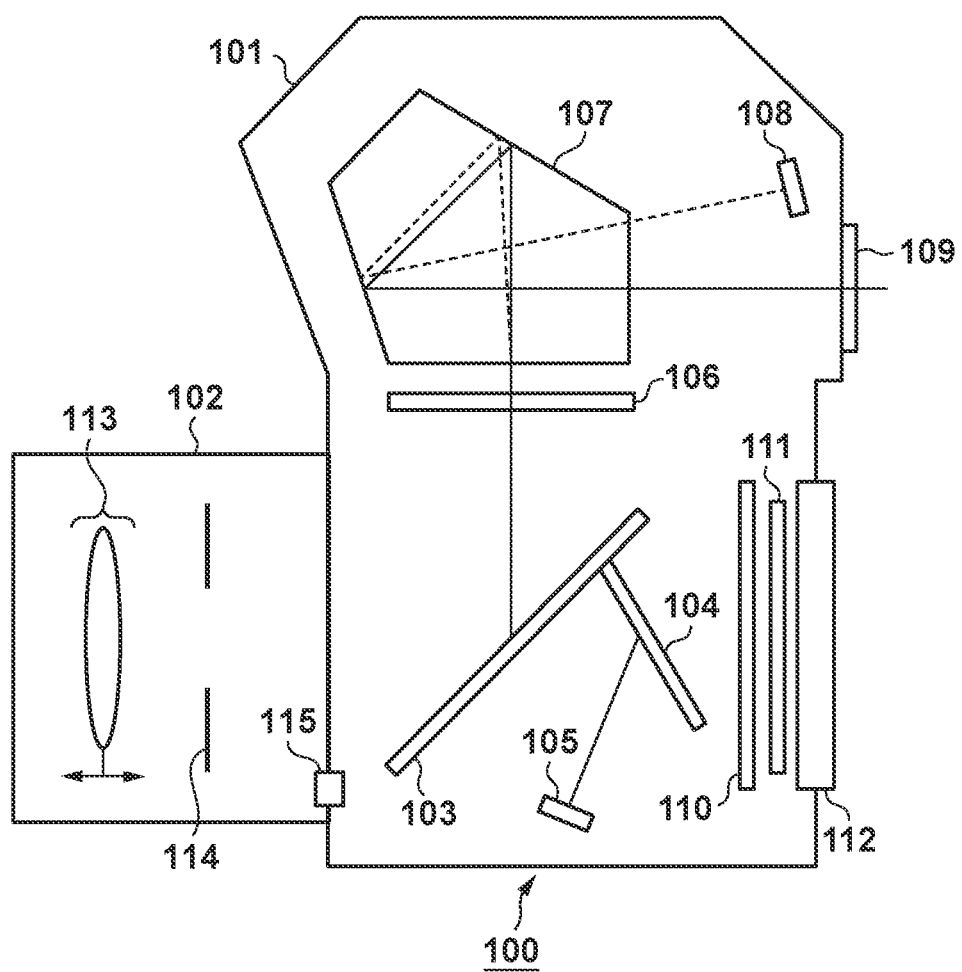
FIG. 1 is a schematic vertical cross-sectional view of a digital single-lens reflex camera, as one example of an image processing apparatus according to an embodiment of the present invention.
Figure 2:
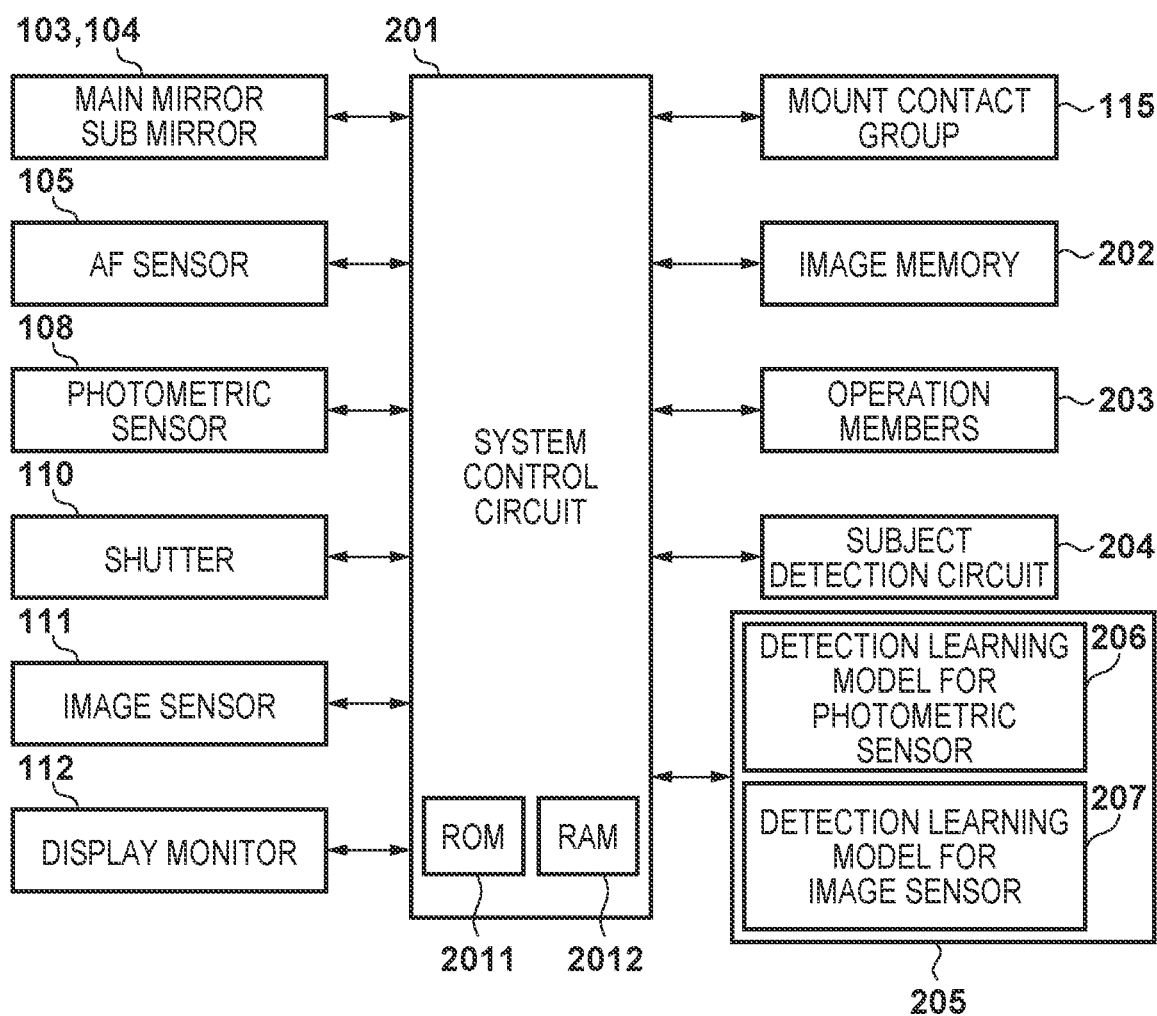
FIG. 2 is a block diagram illustrating an example of a functional configuration of the digital single-lens reflex camera according to the embodiment.

FIG. 1 is a vertical cross-sectional view of a digital single-lens reflex camera (DSLR) 100 according to the present embodiment. Further, FIG. 2 is a block diagram illustrating an example of a functional configuration of the DSLR 100. In all of the drawings, the same reference numerals indicate the same constituent elements.

The DSLR 100 includes a main body 101 and a shooting lens 102 (interchangeable lens) that is detachably attached to the main body 101. The attachment/detachment portion (mount) of each of the main body 101 and the shooting lens 102 has a mount contact group 115. When the shooting lens 102 is attached to the main body 101, the mount contact groups 115 come into contact with one another and an electric connection between the shooting lens 102 and the main body 101 is established.

A system control circuit 201 includes one or more programmable processors, a ROM 2011, and a RAM 2012. The system control circuit 201 controls the operations of the main body 101 and the shooting lens 102 by loading a program stored in the ROM 2011 to the RAM 2012 and executing the program. Various setting values, GUI data, and the like, are stored in the ROM 2011, as well as the program executed by the system control circuit 201.

The shooting lens 102 is provided with a focus lens 113 for adjusting the focus distance and a diaphragm 114 for adjusting the amount of light that enters the main body 101 (and also motors, actuators, etc., that drive these components). Driving of the focus lens 113 and the diaphragm 114 is controlled by the camera main body 101, via the mount contact groups 115.

A main mirror 103 and a sub mirror 104 constitute an instant return mirror. The reflectivity (transmissivity) of a part of the main mirror 103 is controlled in order to separate the beam of light entering from the shooting lens 102 into a beam of light that travels toward a finder optical system (upward in the drawing) and a beam of light that travels toward the sub mirror 104.

FIG. 1 illustrates a state during use of an optical finder (when shooting is not being performed), and the main mirror 103 is located in the optical path of the beam of light entering from the shooting lens 102. In this state, light reflected by the main mirror 103 enters the finder optical system, and a beam of light bent by a pentaprism 107 is emitted from an eyepiece 109. Thus, a user is able to see an optical subject image by looking into the eyepiece 109.

Further, light transmitted by the main mirror 103 is reflected by the sub mirror 104 and enters an AF sensor 105 (a first image sensor). The AF sensor 105 forms a secondary imaging plane of the shooting lens 102 on a line sensor and generates a pair of image signals (focus detection signals) that can be used for focus detection according to a phase difference detection method. The generated focus detection signals are transmitted to the system control circuit 201. The system control circuit 201 calculates a defocusing value of the focus lens 113 by using the focus detection signals, and controls the drive direction and drive amount of the focus lens 113 based on the defocusing value.

A focusing plate 106 is arranged at an expected imaging plane of the shooting lens 102, inside the finder optical system. The user looking into the eyepiece 109 observes an optical image formed on the focusing plate 106. Note that, as well as the optical image, image shooting information such as the shutter speed and aperture can also be presented together with the optical image.

A photometric sensor 108 generates an image signal (exposure control signal) from the beam of light incident thereupon and transmits the exposure control signal to the system control circuit 201. The system control circuit 201 uses the received exposure control signal to perform automatic exposure control and to control the subject detection performed by a later-described subject detection circuit 204. The photometric sensor 108 is an image sensor in which pixels provided with photoelectric conversion units are two-dimensionally arranged.

Upon exposure of an image sensor 111, the main mirror 103 and the sub mirror 104 move out of the optical path of the beam of light entering from the shooting lens 102. Also, a focal plane shutter 110 (referred to simply as "shutter" hereinafter) opens.

Pixels provided with photoelectric conversion units are two-dimensionally arranged in the image sensor 111 (a second image sensor). The image sensor 111 photoelectrically converts a subject optical image formed by the shooting lens 102 by using the pixels and transmits image signals to the system control circuit 201. The system control circuit 201 generates image data from received image signals. The system control circuit 201 displays the image data on a monitor 112, which is an LCD or the like, and also stores the image data in an image memory 202. Further, the image data generated by the image sensor 111 is also supplied for subject detection to the subject detection circuit 204. Note that the system control circuit 201 may use the image data and perform focus detection according to a contrast method.

Further, in the present embodiment, it is supposed that each pixel of the image sensor 111 is provided with two photoelectric conversion units (defined as a photoelectric conversion unit A and a photoelectric conversion unit B) and has a configuration in which image signals can be read out independently from the individual photoelectric conversion units. That is, in one instance of exposure of the image sensor 111, the image sensor 111 is capable of generating:

an image signal (referred to as an A image) obtained from a group of photoelectric conversion units A;

an image signal (referred to as a B image) obtained from a group of photoelectric conversion units B; and an image signal (referred to as an A+B image) obtained by adding, pixel by pixel, the image signal obtained from the photoelectric conversion units A and the image signal obtained from the photoelectric conversion units B.

The A image and the B image constitute one pair of parallax images. Accordingly, focus detection according to a phase difference detection method can be performed based on the A image and the B image. In the present embodiment, it is supposed that, when shooting of a still image is performed, the A+B image is acquired and focus detection is performed by using the AF sensor 105. On the other hand, it is supposed that, when shooting of a moving image is performed, the A+B image and the A image are acquired because image signals cannot be obtained from the AF sensor 105. The B image is generated by subtracting the A image from the A+B image. Note that the B image may be acquired in place of the A image.

The operation members 203 comprise a group of input devices that are provided on the main body 101 and the shooting lens 102 and that can be operated by the user. Specific examples of input devices included among the operation members 203 include a release button, a power switch, direction keys, a determination button, a menu button, an operation mode selection dial, and the like, but the present invention is not limited to these input devices. Operations made on the operation members 203 are detected by the system control circuit 201.

For example, when a halfway press operation on the release button is detected, the system control circuit 201 starts a still image shooting preparation operation. The shooting preparation operation is an operation related to automatic focus detection (AF) and automatic exposure control (AE). Further, when a full press operation on the release button is detected, the system control circuit 201 executes shooting and recording operations of a still image. The system control circuit 201 displays the image obtained by the shooting for a certain period of time on the monitor 112.

Further, when shooting of a moving image is performed (during a shooting standby state and during the recording of a moving image), the system control circuit 201 displays the moving image obtained by the shooting in real-time on the monitor 112 and thereby makes the monitor 112 function as an electronic viewfinder (EVF). The moving image and a frame image thereof that are displayed when the monitor 112 is made to function as an EVF are referred to as a live-view image or a through image. Whether or not to shoot a still image or a moving image can be selected via the operation members 203, and the system control circuit 201 switches the control methods of the camera main body 101 and the shooting lens 102 between when a still image is being shot and when a moving image is being shot.

The subject detection circuit 204 is configured by using a graphic processing unit (GPU). Originally, GPUs are processors for image processing. However, GPUs are also often used as processors for performing machine learning processing because GPUs have a plurality of product-sum operators and are good at matrix calculation. Further, it is also common for GPUs to be used in deep learning processing. For example, the Jetson TX2 module produced by NVIDIA Corporation can be used as the subject detection circuit 204. Note that a field-programmable gate array (FPGA), an application specific integrated circuit (ASIC), or the like may be used as the subject detection circuit 204. The subject detection circuit 204 applies subject detection processing to supplied image data by using one learning model selected by the system control circuit 201 from a plurality of learning models stored in a learning model memory (i.e., a storage device) 205. Details of the subject detection processing will be described later. For example, the learning model memory 205 may be a rewritable non-volatile memory, or may be a part of the ROM 2011. In the present embodiment, the learning model memory 205 stores therein learning models 206 and 207, each corresponding to one image sensor that generates an image signal which is to be the source of image data to be subjected to the subject detection processing.

Switching of Learning Model in Subject Detection

The DSLR 100 of the present embodiment applies subject detection to image data based on an image signal generated by each of the photometric sensor 108 and the image sensor 111, to which light enters from different paths. While details of the subject detection are described later, learning models generated in advance through machine learning are used in the subject detection.

The photometric sensor 108 and the image sensor 111 are similar in that they both generate an image signal by photoelectrically converting an optical image by using a plurality of two-dimensionally arrayed pixels. However, an image signal generated by the photometric sensor 108 and an image signal generated by the image sensor 111 have different characteristics (image quality). This difference in image quality occurs because the optical path, sensor structure, signal processing, etc., differ between the photometric sensor 108 and the image sensor 111. Further, there are cases in which the processing when image data is generated by the system control circuit 201 also differs between the photometric sensor 108 and the image sensor 111. Generally, an image signal generated by the photometric sensor 108 has a lower sense of resolution and lower color reproducibility compared to an image signal generated by the image sensor 111. This is very much due to the fact that, while the image sensor 111 is provided to generate image signals for viewing, the photometric sensor 108 is provided to generate image signals for exposure control. However, even if the exact same devices are used for the photometric sensor 108 and the image sensor 111, a difference in image quality originating from differences in incident light paths, processing performed when generating image data, etc., will occur.

Thus, detection accuracy may decrease if a learning model generated through machine learning based on image signals generated by the photometric sensor 108 is used for subject detection with respect to an image signal generated by the image sensor 111, and vice versa. Thus, in the present embodiment, different learning models are prepared, each corresponding to one image sensor that generates an image signal (or to one of images having different characteristics). Further, the subject detection processing is applied to an image signal by using a learning model corresponding to the sensor having generated the image signal.

Specifically, the subject detection circuit 204 uses the learning model 206 for the photometric sensor with respect to image data that is based on an image signal generated by the photometric sensor 108. Further, the subject detection circuit 204 uses the learning model 207 for the image sensor with respect to image data that is based on an image signal generated by the image sensor 111.

Shooting Operations

Next, shooting operations of the DSLR 100 of the present invention are described with reference to FIGS. 3 to 5.

Figure 3:
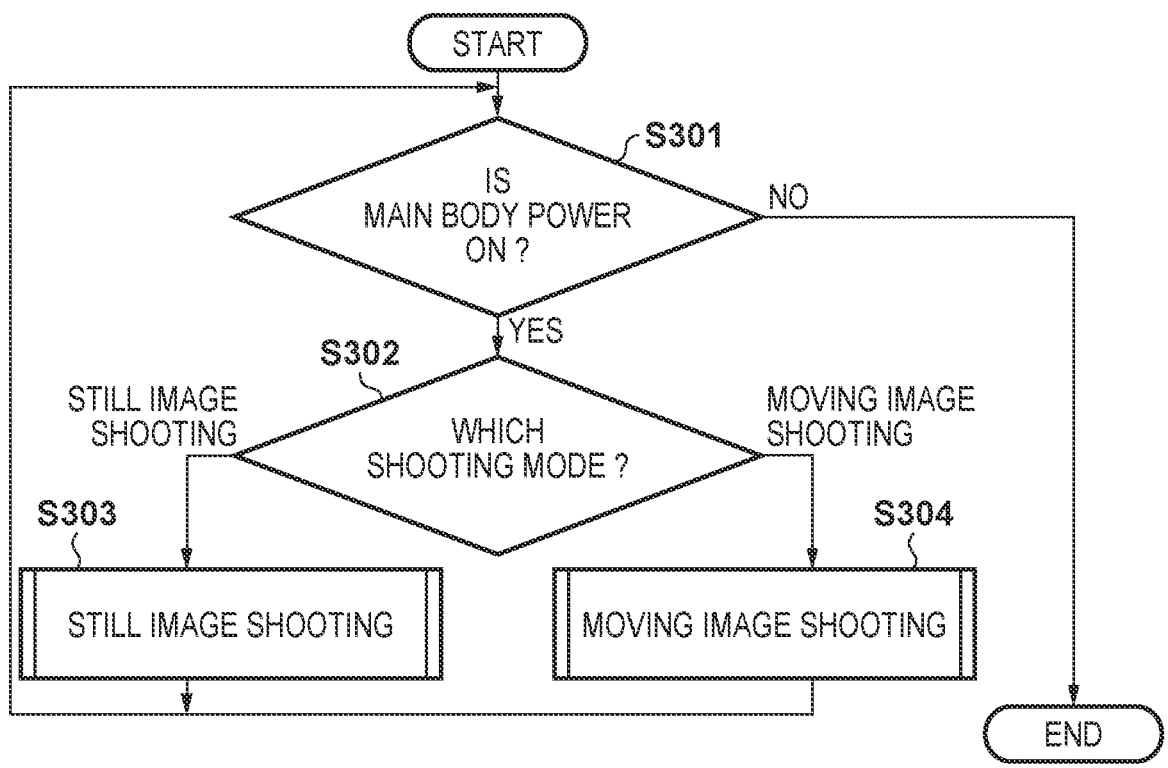
FIG. 3 is a flowchart regarding an overview of shooting operations according to the embodiment.

FIG. 3 is a flowchart regarding an overview of shooting operations, and the processing in each step is realized by the programmable processor of the system control circuit 201 executing a program loaded from the ROM 2011 to the RAM 2012.

In step S301, the system control circuit 201 determines whether the power of the main body 101 is on, and ends processing if it is determined that the power is not on and advances to step S302 if it is determined that the power is on. For example, the determination can be made based on a reference made to the state of the power switch included among the operation members 203, a flag indicating whether the power is on or off, etc.

In step S302, the system control circuit 201 determines the shooting mode. Here, it is supposed that the determination is a determination of whether the shooting mode is a still image shooting mode or a moving image shooting mode, but other shooting modes may also be set. The shooting mode can be changed by user operations performed on the operation members 203. The system control circuit 201 advances processing to step S303 if it is determined that the still image shooting mode is the shooting mode, and advances processing to step S304 if it is determined that the moving image shooting mode is the shooting mode.

In step S303, the system control circuit 201 performs still image shooting processing, and returns processing to step S301. Further, in step S304, the system control circuit 201 performs moving image shooting processing, and returns processing to step S301. The still image shooting processing and the moving image shooting processing are described in the following by using FIG. 4 and FIG. 5, respectively.

Still Image Shooting Processing

Figure 4:
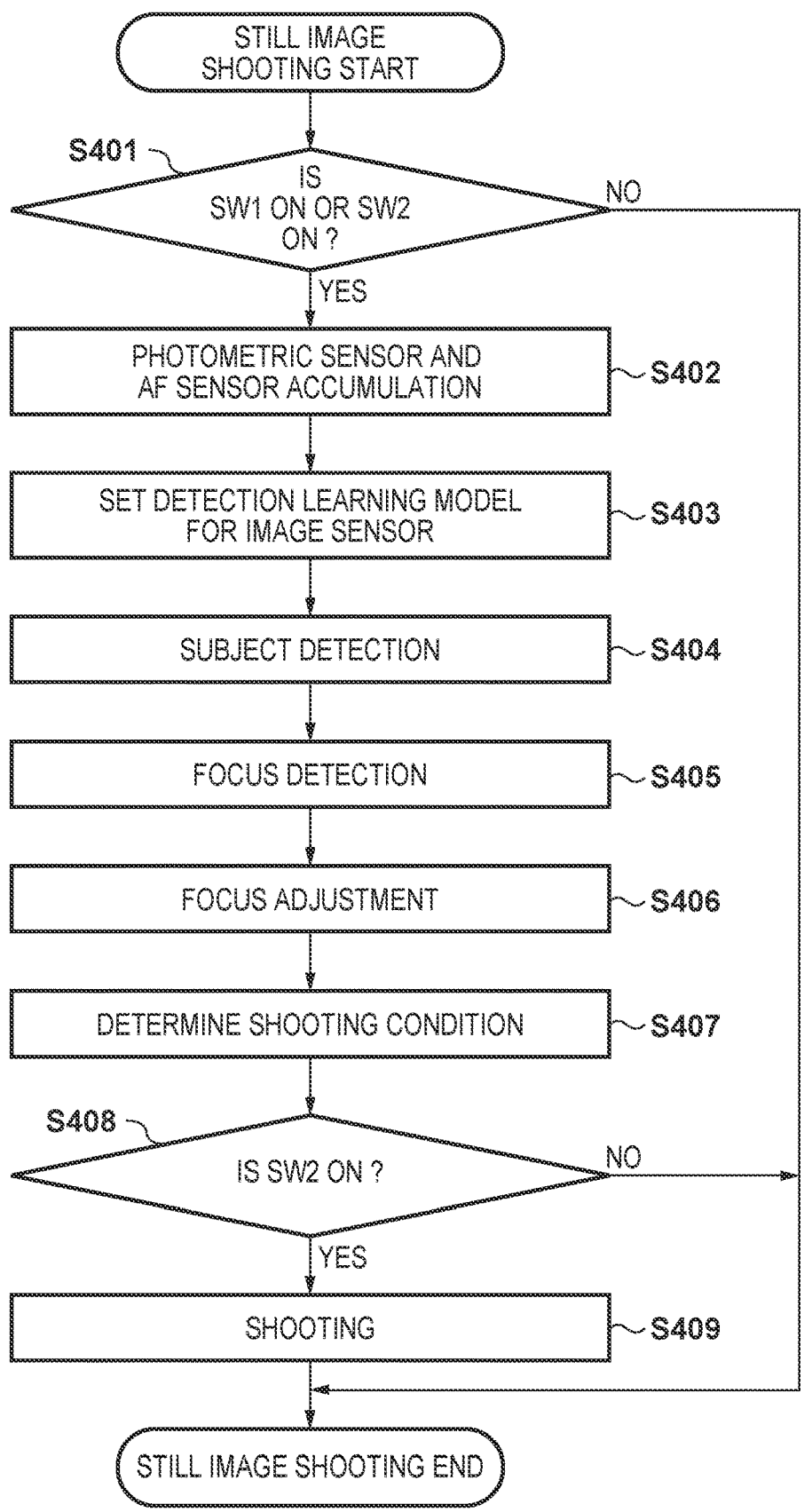
FIG. 4 is a flowchart regarding a still image shooting operation according to the embodiment.
Figure 5:
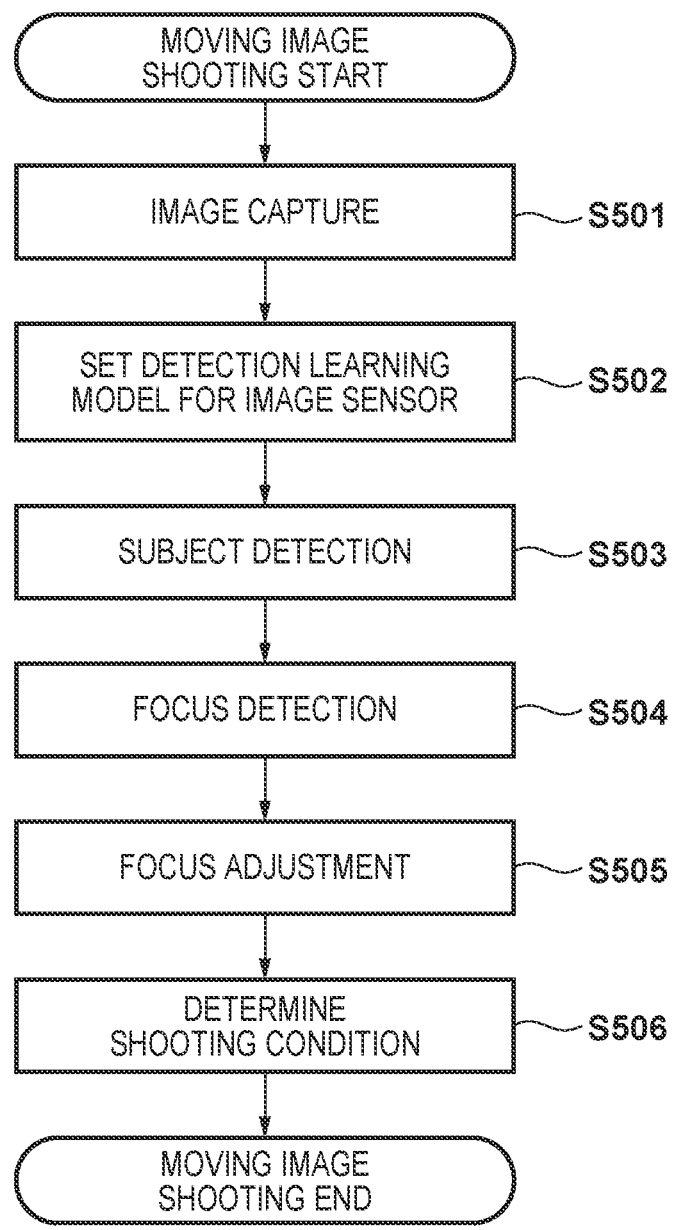
FIG. 5 is a flowchart regarding a moving image shooting operation according to the embodiment.

FIG. 4 is a flowchart regarding details of the still image shooting processing shown in step S303 in FIG. 3.

In step S401, the system control circuit 201 detects the state of a switch SW1 and the state of a switch SW2. The switch SW1 is switched on with a halfway press operation on the release button, and the switch SW2 is switched on with a full press operation on the release button. Further, the system control circuit 201 advances processing to step S402 if one of the switches SW1 and SW2 is on, and ends processing if both switches SW1 and SW2 are off.

In step S402, the system control circuit 201 performs exposure processing (charge accumulation) of the photometric sensor 108. The exposure processing of the photometric sensor 108 is realized by performing charge accumulation for a predetermined amount of time by using a so-called electronic shutter. The system control circuit 201 controls the operations of the photometric sensor 108 and performs charge accumulation for the predetermined amount of time, and reads out an image signal (exposure control signal) from the photometric sensor 108. Further, the system control circuit 201 also performs exposure processing (charge accumulation) of the AF sensor 105, and reads out image signals (focus detection signals).

In step S403, the system control circuit 201 (selecting unit) selects the learning model 206 for the photometric sensor from the plurality of learning models stored in the learning model memory 205, and sets the learning model 206 for the photometric sensor to the subject detection circuit 204 as a parameter for the subject detection processing. Further, the system control circuit 201 supplies the subject detection circuit 204 with image data generated by performing A/D conversion, noise reduction processing, etc., on the exposure control signal read out in step S402.

Here, it is supposed that the optical finder is in use when a still image is shot. However, determination of whether the EVF (monitor 112) is in use or whether the optical finder is in use may be made. When still image shooting in which the optical finder is not used is performed, the system control circuit 201 selects the learning model 207 for the image sensor from the plurality of learning models stored in the learning model memory 205, and sets the learning model 207 for the image sensor to the subject detection circuit 204 as a parameter for the subject detection processing. The determination of whether or not the optical finder is in use can be performed according to a known method, such as a method in which a proximity sensor disposed in the vicinity of the eyepiece 109 is used.

In step S404, the subject detection circuit 204 applies the subject detection processing to image data based on the exposure control signal by using the learning model 206 for the photometric sensor set in step S403. Details of the subject detection processing will be described later. The subject detection circuit 204 supplies the system control circuit 201 with information indicating the detection results. The information indicating the detection results may include information relating to whether or not subjects were detected (number of subjects detected) and information relating to detected subject areas (for example, the positions and sizes thereof).

In step S405, if at least one subject was detected as a result of the subject detection in step S404, the system control circuit 201 selects the focus detection area closest to the position of the detected subject. Note that if a plurality of subjects were detected, the system control circuit 201, for example, determines a representative subject based on the sizes and positions of the subject areas and selects the focus detection area closest to the position of the representative subject. Further, the system control circuit 201 calculates, based on focus detection signals, a focus state (defocusing value and direction) for the selected focus detection area.

Note that if no subject was detected in step S404, the system control circuit 201 calculates, based on focus detection signals, focus states (defocusing values and directions) for all selectable focus detection areas. Further, the system control circuit 201 selects the focus detection area with a subject present at the closest distance.

In step S406, the system control circuit 201 controls the position of the focus lens 113 based on the focus state of the focus detection area selected in step S405, and thereby adjusts the focus distance of the shooting lens 102.

In step S407, the system control circuit 201 determines image shooting conditions (the aperture (AV value), the shutter speed (TV value), and the ISO sensitivity (ISO value)) by using the exposure control signal read out in step S402. There is no particular limitation regarding the method for determining the image shooting conditions, but here, it is supposed that image shooting conditions corresponding to a brightness value (By value) obtained based on the exposure control signal are determined by referring to a program diagram that is stored in advance. Note that the image shooting conditions may be determined by using the brightness of a subject area detected through the subject detection processing.

In step S408, the system control circuit 201 detects the state of the switch SW2, and advances processing to step S409 if the switch SW2 is on and ends processing if the switch SW2 is off.

In step S409, the system control circuit 201 executes image shooting processing of a still image. The system control circuit 201 moves the main mirror 103 and the sub mirror 104 to positions where the main mirror 103 and the sub mirror 104 do not intersect the beam of light from the shooting lens 102, and drives the shutter 110 according to the shutter speed determined in step S407. Hence, the image sensor 111 is exposed to an optical image formed by the shooting lens 102. The image sensor 111 generates an image signal obtained by converting the charge accumulated by each pixel during the exposure period into a voltage. The system control circuit 201 reads out the image signal from the image sensor 111, and generates image data by applying predetermined image processing such as A/D conversion, noise reduction, white balance adjustment, and color interpolation. The system control circuit 201 stores the generated image data to the image memory 202 as an image data file, and generates a display image signal based on the image data and displays the display image signal on the monitor 112.

Moving Image Shooting Processing

Next, details of the moving image shooting processing in step S304 in FIG. 3 will be described with reference to the flowchart shown in FIG. 5. A moving image shooting operation is executed during shooting standby and is executed in accordance with the detection of an instruction to start recording a moving image. Note that moving image shooting during shooting standby differs from moving image shooting for recording in terms of the resolution (number of pixels), etc., because the purpose of moving image shooting during shooting standby is to generate a through image for display. However, the contents of the subject detection processing essentially do not change, and thus, a description is provided in the following without paying particular attention to the purpose of shooting a moving image.

In step S501, the system control circuit 201 executes processing corresponding to one frame of a moving image and generates image data. In moving image shooting, shooting is continuously performed at a predetermined frame rate, and thus the shutter 110 is fully open and the main mirror 103 and the sub mirror 104 are in a moved state. Further, the exposure time of the image sensor 111 is adjusted by controlling the charge accumulation time. The system control circuit 201 repeats the accumulation of charge, the reading out of image signals, and the resetting of accumulated charge each time one frame is shot. The system control circuit 201 generates image data by applying image processing to image signals (A+B image and A image) read out from the image sensor 111, and stores the A+B image to the image memory 202. Further, the system control circuit 201 generates a display image corresponding to the A+B image and displays the display image on the monitor 112 as a through image. Further, the system control circuit 201 stores the A image and a B image generated from the A+B image and the A image to the RAM 2012, for example, in order to perform focus detection.

In step S502, the system control circuit 201 sets the learning model 207 for the image sensor to the subject detection circuit 204 as a parameter for subject detection processing. Further, the system control circuit 201 supplies the subject detection circuit 204 with the image data stored in the image memory 202.

In step S503, the subject detection circuit 204 applies the subject detection processing to the image data supplied from the system control circuit 201 by using the learning model 207 for the image sensor set in step S502. Details of the subject detection processing will be described later. The subject detection circuit 204 supplies the system control circuit 201 with information indicating the detection results. The information indicating the detection results may include information relating to whether or not subjects were detected (number of subjects detected) and information relating to detected subject areas (for example, the positions and sizes thereof).

In step S504, if at least one subject was detected as a result of the subject detection in step S503, the system control circuit 201 selects the focus detection area closest to the position of the detected subject. Note that if a plurality of subjects were detected, the system control circuit 201 for example determines a representative subject based on the sizes and positions of the subject areas and selects the focus detection area closest to the position of the representative subject.

Further, for each of the A image and B image stored in the RAM 2012, the system control circuit 201 links pieces of pixel data included in an area corresponding to the selected focus detection area, and generates one pair of image signals (focus detection signals). For example, when each pixel has two photoelectric conversion units that are side by side in the horizontal direction, the system control circuit 201 links pieces of pixel data lined up in the horizontal direction to generate an image signal. The system control circuit 201 calculates a focus state (defocusing value and direction) by treating the pair of image signals generated from the A image and the B image in a similar manner as a pair of image signals obtained from the AF sensor 105.

In step S505, the system control circuit 201 controls the position of the focus lens 113 according to a lens drive amount and drive direction corresponding to the defocusing value and defocusing direction calculated in step S504, and thereby adjusts the focus distance of the shooting lens 102.

In step S506, the system control circuit 201 determines shooting conditions (the aperture (AV value), the shutter speed (TV value), and the ISO sensitivity (ISO value)) by using the image signal (A+B image) read out in step S501. There is no particular limitation regarding the method for determining the image shooting conditions, but here, it is supposed that image shooting conditions corresponding to a brightness value (By value) obtained based on the image signal are determined by referring to a program diagram that is stored in advance. Note that the image shooting conditions may be determined by using the brightness of a subject area detected through the subject detection processing.

The processing from steps S502 to S506 is performed for the processing of the next frame (the next execution of step S501). The processing from steps S501 to S505 is repetitively executed in step S304 for as long as the moving image shooting mode is determined as being the shooting mode in step S302, until it is determined in step S301 in FIG. 3 that the power switch is not on.

Details of Subject Detection

Figure 6:
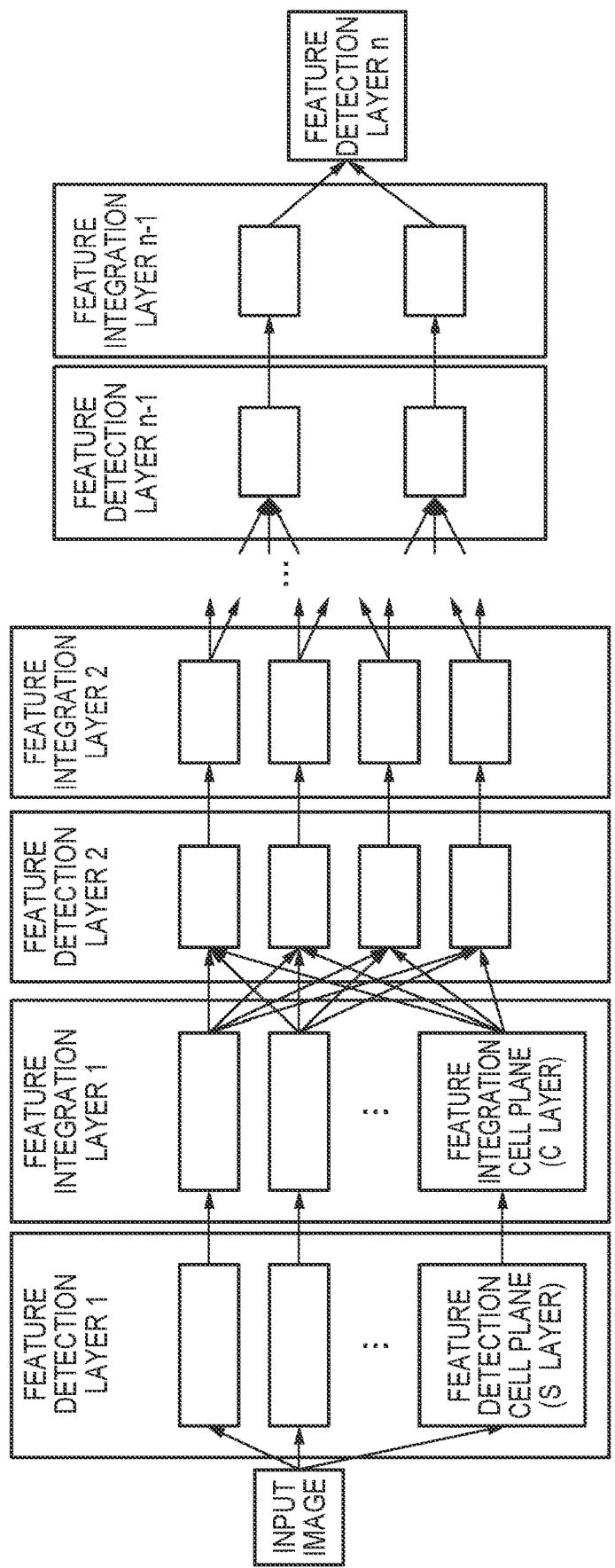
FIG. 6 is a schematic diagram illustrating a configuration example of a CNN used by a subject detection circuit according to the embodiment.

Next, the subject detection circuit 204 and the subject detection processing are described. In the present embodiment, the subject detection circuit 204 is configured using neocognitron, which is one type of convolutional neural network (CNN). The basic configuration of the subject detection circuit 204 will be described using FIGS. 6 and 7. FIG. 6 illustrates the basic configuration of a CNN for detecting subjects from two-dimensional image data that is input. Processing flows in the following manner; input is at the left end and processing advances toward the right. The CNN is configured such that sets each consisting of two layers, one of which is referred to as a feature detection layer (S layer) and the other of which referred to as a feature integration layer (C layer), are hierarchically-arranged. Note that the S layers correspond to the convolutional layers described in the description of the related art, and the C layers correspond to the pooling layers or sub-sampling layers described in the description of the related art.

In the CNN, subsequent features are first detected in the S layer based on features detected in the previous level. Further, the CNN has a configuration in which the features detected in the S layer are integrated in the C layer, and are transmitted to the next level as detection results in the present level.

The S layer is constituted of feature detection cell planes, and each feature detection cell plane detects a different feature. Further, the C layer is constituted of feature integration cell planes, and performs pooling or sub-sampling of the results of detection at the feature detection cell planes of the previous level. In the following, the feature detection cell planes and the feature integration cell planes are collectively referred to as feature planes where it is not particularly necessary to make a distinction therebetween. In the present embodiment, an output layer (the nth level), which is the final level, is configured using only a S layer without using a C layer.

Figure 7:
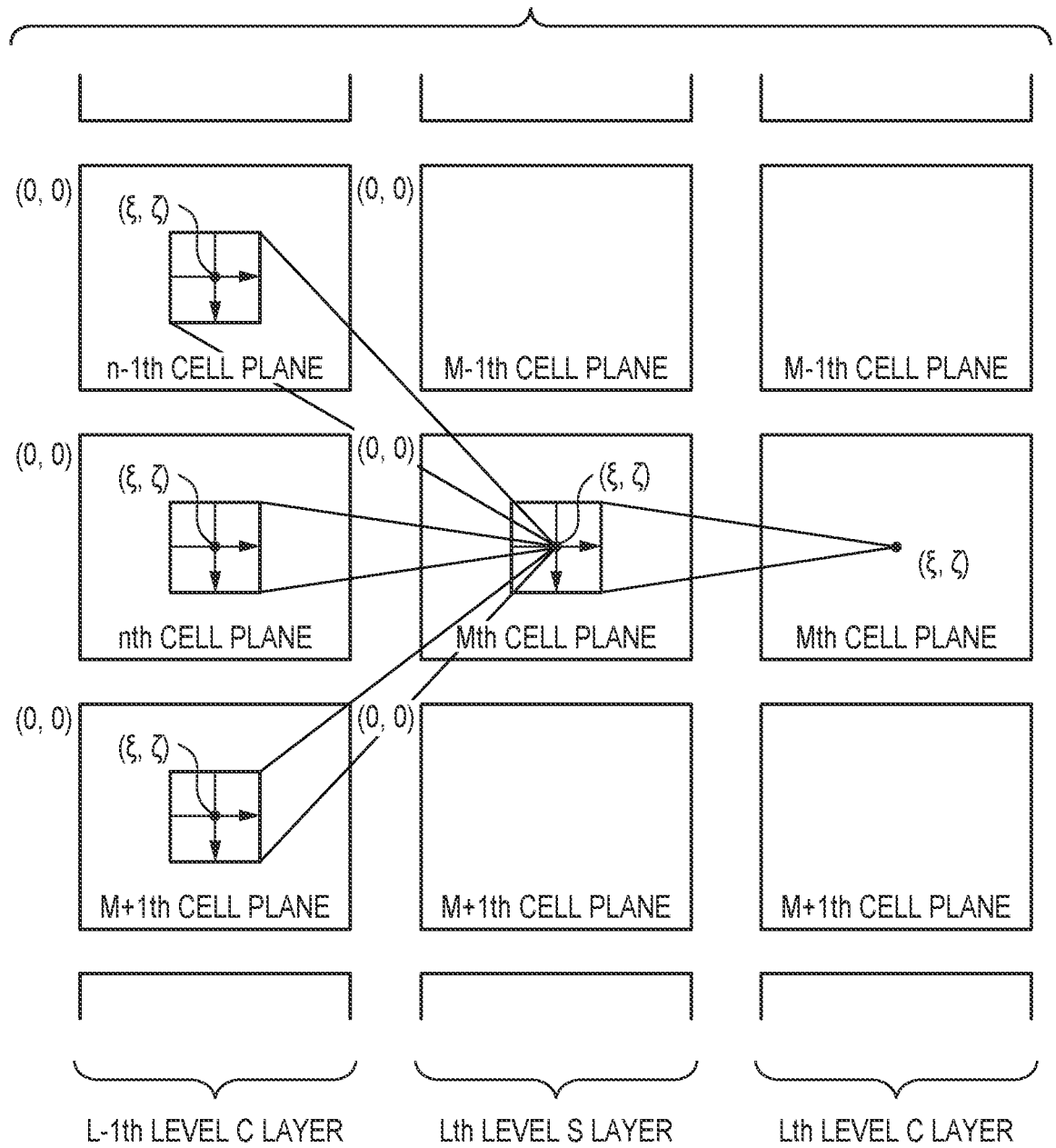
FIG. 7 is a schematic diagram illustrating a configuration of a part of the CNN in FIG. 6.

Details of feature detection processing at the feature detection cell planes and feature integration processing at the feature integration cell planes are described using FIG. 7. One feature detection cell plane is constituted of a plurality of feature detection neurons, and the individual feature detection neurons are connected to the C layer of the previous level in a predetermined structure. Further, one feature integration cell plane is constituted of a plurality of feature integration neurons, and the individual feature integration neurons are connected to the S layer of the same level in a predetermined structure.

The output value of a feature detection neuron at a position $(\xi, \zeta)$ in an Mth cell plane in the S layer of the Lth level, illustrated in FIG. 7, is denoted as $y_M^{LS}(\xi, \zeta)$. Further, the output value of a feature integration neuron at the position $(\xi, \zeta)$ in an Mth cell plane in the C layer of the Lth level is denoted as $y_M^{LC}(\xi, \zeta)$. In this case, when the connection coefficients of the respective neurons are defined as $w_M^{LS}(n, u, v)$, $w_M^{LC}(u, v)$, the respective output values can be expressed as follows.

$$y_M^{LS}(\xi, \zeta) \equiv f(u_M^{LS}(\xi, \zeta)) \equiv f\left\{\sum_{n,u,v} w_M^{LS}(n, u, v) \cdot y_n^{L-1C}(\xi+u, \zeta+v)\right\} \quad \text{[Formula 1]}$$

$$y_M^{LC}(\xi, \zeta) \equiv u_M^{LC}(\xi, \zeta) \equiv \sum_{u,v} w_M^{LC}(u, v) \cdot y_M^{LS}(\xi+u, \zeta+v) \quad \text{[Formula 2]}$$

Here, the "f" in Formula. 1 is an activation function, and for example is a sigmoid function such as a hyperbolic tangent function or a logistic function. Further, $u_M^{LS}(\xi, \zeta)$ indicates the internal state of the feature detection neuron at the position $(\xi, \zeta)$ in the Mth cell plane of the S layer of the Lth level. No activation function is used in Formula. 2, and Formula. 2 is expressed as a simple linear sum.

If no activation function is used as in Formula. 2, the internal state $u_M^{LC}(\xi, \zeta)$ of the neuron and the output value $y_M^{LC}((\xi, \zeta)$ of the neuron are equal. Further, $y_n^{L-1C}(\xi+u, \zeta+v)$ in Formula. 1 is referred to as a connection destination output value of the feature detection neuron, and $y_M^{LS}(\xi+u, \zeta+v)$ in Formula. 2 is referred to as a connection destination output value of the feature integration neuron.

Here, "$\xi$", "$\zeta$", "u", "v", and "n" in Formula. 1 and Formula. 2 are described. The position $(\xi, \zeta)$ corresponds to position coordinates in the input image, and if the output value $y_M^{LS}(\xi, \zeta)$ is large, for example, this indicates that the possibility is high that the feature detected by the Mth cell plane of the S layer of the Lth level is present at the pixel position $(\xi, \zeta)$ in the input image. Further, "n" in Formula. 1 indicates the nth cell plane of the C layer of the L−1th level, and is referred to as a connection destination feature number. Basically, a product-sum operation is performed for every cell plane present in the C layer of the L−1th level. "(u, v)" are relative position coordinates of the connection coefficient, and the product-sum operation is performed within a finite range of (u, v) in accordance with the size of the feature to be detected. This finite range of (u, v) is referred to as a receptive field. Further, the size of the receptive field is referred to as a receptive field size in the following, and is expressed by the number of horizontal pixels times the number of vertical pixels in a connected range.

Further, if L=1 in Formula. 1, or that is, for the S layer of the initial level, $y_n^{L-1C}(\xi+u, \zeta+v)$ in Formula. 1 is the input image $y^{in\_image}(\xi+u, \zeta+v)$. Also, neurons and pixels are discretely distributed, and the connection destination feature numbers are also discrete. Accordingly, "$\xi$", "$\zeta$", "u", "v", and "n" take discrete values. Here, "$\xi$" and "$\zeta$" are non-negative integers, "n" is a natural number, and "u" and "v" are integers, and these variables each have a finite range.

$w_M^{LS}(n, u, v)$ in Formula. 1 is a connection coefficient for detecting a predetermined feature, and the predetermined feature becomes detectable by adjusting the connection coefficient to an appropriate value. The adjustment of this connection coefficient is learning, and in the building of the CNN, the connection coefficient is adjusted by repetitively and gradually correcting the connection coefficient so that $y_M^{LS}(\xi, \zeta)$ becomes an appropriate output value.

Next, a two-dimensional Gaussian function is used for $w_M^{LC}(u, v)$ in Formula. 2, which can be expressed as Formula. 3 below.

$$w_M^{LC}(u, v) = \frac{1}{2\pi\sigma_{L,M}^2} \cdot \exp\left(-\frac{u^2+v^2}{2\sigma_{L,M}^2}\right) \quad \text{[Formula 3]}$$

"(u,v)" also has a finite range here, and the range is referred to as a receptive field and the size of the range is referred to as a receptive field size, similarly to the case of the feature detection neuron. Here, the value of the receptive field size can be set as appropriate in accordance with the size of the Mth feature of the S layer of the Lth level. "$\sigma$" in Formula. 3 indicates a feature size factor, and may be a constant that can be set as appropriate in accordance with the receptive field size. For example, the feature size factor $\sigma$ can be set so that the outermost value of the receptive field takes a value that can be regarded as substantially zero. In such a manner, the subject detection circuit 204 of the present embodiment is configured by using a CNN that performs the above-described calculation in each level and performs subject detection at the S layer of the final level (nth level).

Method for Learning Subject Detection

A specific method for adjusting (learning) the connection coefficient $w_M^{LS}(n, u, v)$ is described. Learning refers to the correction of the connection coefficient $w_M^{LS}(n, u, v)$ based on the relation between a neuron output value obtained by providing the CNN with a specific input image (test pattern) and a supervisory signal (the output value that the neuron should output). With regard to the feature detection layer S of the final level (the nth level), a connection coefficient is corrected by using the least squares method, in the learning of the present embodiment. With regard to the feature detection layers S of the other levels (the 1st to (n−1)th levels), a connection coefficient is corrected by using the back-propagation method. A known technique such as that disclosed in, for example, Krizhevsky, Ilya Sutskever, Geoffrey E. Hinton, "ImageNet classification with deep convolutional neural networks", NIPS'12 Proceedings of the 25th International Conference on Neural Information Processing Systems—Volume 1, PP. 1097-1105 can be used as the method for correcting connection coefficients by using the least squares method and the back propagation method, and thus, a description of the details is omitted.

A large number of patterns to be detected and patterns not to be detected are prepared as test patterns for learning. Each test pattern includes image data and a corresponding supervisory signal. For image data corresponding to a pattern to be detected, the supervisory signal is set such that, in a feature detection cell plane in the final level, the output from a neuron corresponding to an area in which the pattern to be detected is present equals "1". On the other hand, for image data corresponding to a pattern not to be detected, the supervisory signal is set such that the output from a neuron corresponding to an area in which the pattern not to be detected is present equals "−1".

In the present embodiment, the learning model 206 for the photometric sensor is prepared through learning with test patterns using image data based on image signals obtained from the photometric sensor 108. Further, the learning model 207 for the image sensor is prepared through learning with test patterns using image data based on image signals obtained from the image sensor 111. By separately performing learning using image signals obtained from the photometric sensor 108 and the learning using image signals obtained from the image sensor 111 in such a manner, learning models that are suitable for the image signals of the respective image sensors and reflect differences in optical paths, sensors, image processing, etc., can be generated.

Note that, while image data for generating the learning model for the image sensor 111 can be easily acquired by executing the still image shooting processing and the moving image shooting processing, the acquisition of image data for generating the learning model for the photometric sensor 108 is not always easy. This is because image data obtained by the photometric sensor 108 is not stored in the image memory 202.

For this reason, image data corresponding to image data based on image signals obtained by the photometric sensor 108 may be generated from image signals obtained by the image sensor 111. For example, based on pieces of image data generated by shooting an image of the same subject using the image sensor 111 and the photometric sensor 108, the differences in optical paths, sensors, image processing, etc., that are reflected in the pieces of image data are detected. Then, the system control circuit 201 applies a correction corresponding to the detected differences to the image data based on image signals obtained by the image sensor 111, whereby image data corresponding to image data based on image signals obtained by the photometric sensor 108 can be generated. There is no limitation on the method for correction, but for example, a difference in sharpness can be realized by applying a low-pass filter or through contrast correction, and a difference in color tone can be realized by color conversion through the application of a lookup table. Such information necessary for correction can be stored in advance to the ROM 2011, for example. Hence, image data for generating the learning model for the photometric sensor 108 can be acquired similarly to image data for generating the learning model for the image sensor 111. Note that the generation of learning models can also be performed on another apparatus.

As described above, according to the present embodiment, subject detection accuracy can be improved by using subject detection parameters that correspond to the image characteristics, in an apparatus capable of performing subject detection with respect to image signals obtained by different image sensors.

Other Embodiments

In the above-described embodiment, a configuration of switching the learning model for subject detection to correspond to each image sensor used in subject detection, in a case in which one image capture apparatus has two image sensors (the photometric sensor 108 and the image sensor 111) with different optical paths, is described as an example. However, the essence of the present invention lies in the use of a parameter for subject detection processing that takes into consideration the characteristics of the image shooting optical system (optical path, lens aberration, etc.), image sensor, signal processing, etc., reflected in an image signal or image data to be subjected to subject detection. Accordingly, the present invention also includes a configuration in which, in an image capture apparatus having one image sensor, different subject detection parameters are used in accordance with image shooting lenses used for image shooting, and a configuration in which different subject detection parameters are used in accordance with image capture apparatuses.

For example, there are smartphones and tablet terminals provided with a plurality of image sensors with different light reception sensitivity, such as an RGB image sensor and an infrared sensor. Also, there are smartphones and tablet terminals provided with a plurality of image shooting optical systems with different optical magnification levels, such as normal, wide-angle, and telephoto image shooting optical systems. The present invention is also applicable to these smartphones and tablet terminals.

Further, a configuration may be adopted in which smartphones and tablet terminals update or download, from a network via a wireless or wired communication, learning models for subject detection processing that take into consideration characteristics of image shooting optical systems, image sensors, signal processing, or the like. In this case, smartphones and tablet terminals will obtain, for the same subject, a plurality of learning models for different image characteristics based on image shooting optical systems, image sensors, signal processing, or the like.

Alternatively, a configuration may be adopted such that servers and edge computers are provided with a subject detection circuit and a plurality of learning models for subject detection processing that take image characteristics into consideration. Servers and edge computers may receive images transmitted from image capture apparatuses and smartphones, perform subject detection processing by selecting learning models in accordance with characteristics of the received images, and transmit detection results to the image capture apparatuses and smartphones from which the images have been transmitted.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Applications No. 2018-075616, filed on Apr. 10, 2018, and No. 2019-055199, filed on Mar. 22, 2019, which are hereby incorporated by reference herein in their entirety.

What is claimed is:

1. An image processing apparatus comprising:
one or more processors that execute a program stored in a memory and thus function as:
a subject detection unit configured to apply subject detection processing to an image by using a learning model generated based on machine learning; and
a selection unit configured to select, from learning models that are stored in a storage device for storing a plurality of learning models for use in the subject detection processing, a learning model to be used by the subject detection unit in accordance with characteristics of the image to which the subject detection processing is to be applied,
wherein the selection unit selects a first learning model when applying the subject detection processing to an image generated by a first image sensor, the first learning model being acquired by performing machine learning using images corresponding to the first image sensor,
the selection unit selects a second learning model when applying the subject detection processing to an image generated by a second image sensor, the second learning model being acquired by performing machine learning using images corresponding to the second image sensor, and the first image sensor and the second image sensor are provided in a same image capture apparatus.

2. The image processing apparatus according to claim 1, wherein the first learning model is a learning model acquired by performing machine learning using images generated by the first image sensor, and the second learning model is a learning model acquired by performing machine learning using images generated by the second image sensor.

3. The image processing apparatus according to claim 1, wherein the first learning model is a learning model acquired by performing machine learning using images generated by the first type of image sensor, and the second learning model is a learning model acquired by performing machine learning using images acquired by correcting the images generated by the first image sensor.

4. The image processing apparatus according to claim 1, the one or more processors further function as a communication unit configured to acquire the learning model to be used by the subject detection unit from the storage device via a network.

5. The image processing apparatus according to claim 1, wherein the machine learning uses a convolutional neural network (CNN).

6. An image processing apparatus comprising:

one or more processors that execute a program stored in a memory and thus function as:

a subject detection unit configured to apply subject detection processing to an image by using a learning model generated based on machine learning; and a selection unit configured to select, from learning models that are stored in a storage device for storing a plurality of learning models for use in the subject detection processing, a learning model to be used by the subject detection unit in accordance with characteristics of the image to which the subject detection processing is to be applied, wherein the selection unit selects a first learning model when applying the subject detection processing to an image shot by using a first optical system, the first learning model being acquired by performing machine learning using images corresponding to the first optical system, the selection unit selects a second learning model when applying the subject detection processing to an image shot by using a second optical system, the second learning model being acquired by performing machine learning using images corresponding to the second optical system, and the first optical system and the second optical system are used in a same image capture apparatus.

7. The image processing apparatus according to claim 6, wherein the first learning model is a learning model acquired by performing machine learning using images shot by using the first optical system, and the second learning model is a learning model acquired by performing machine learning using images shot by using the second optical system.

8. The image processing apparatus according to claim 6, wherein the first learning model is a learning model acquired by performing machine learning using images shot by using the first optical system, and the second learning model is a learning model acquired by performing machine learning using images acquired by correcting the image shot by using the first optical system.

9. An image capture apparatus comprising an image processing apparatus that comprises:

one or more processors that execute a program stored in a memory and thus function as:

a subject detection unit configured to apply subject detection processing to an image by using a learning model generated based on machine learning; and a selection unit configured to select, from learning models that are stored in a storage device for storing a plurality of learning models for use in the subject detection processing, a learning model to be used by the subject detection unit in accordance with characteristics of the image to which the subject detection processing is to be applied, wherein the selection unit selects a first learning model when applying the subject detection processing to an image generated in a moving image shooting mode, the first learning model being acquired by performing machine learning using images corresponding to the moving image shooting mode, and the selection unit selects a second learning model when applying the subject detection processing to an image generated in a still image shooting mode, the second learning model being acquired by performing machine learning using images corresponding to the still image shooting mode.

10. The image capture apparatus according to claim 9, further comprising a first image sensor and a second image sensor, wherein in the still image shooting mode, the first image sensor is used and the second image sensor is not used, and in the moving image shooting mode, the second image sensor is used and the first image sensor is not used.

11. The image capture apparatus according to claim 10, wherein in the still image shooting mode, an optical finder is in use, and in the moving image shooting mode, the optical finder is not used.

12. The image capture apparatus according to claim 9, wherein the first image sensor is used for acquiring an image for exposure control in the still image shooting mode.

13. An image processing method executed by an image processing apparatus, comprising:

applying subject detection processing to an image by using a learning model generated based on machine learning; and selecting, in accordance with characteristics of the image to which the subject detection processing is to be applied, a learning model to be used in the subject detection processing to be applied to the image from a storage device for storing a plurality of learning models for use in the subject detection processing, wherein in the selecting, a first learning model is selected when the subject detection processing is applied to an image generated by a first image sensor, the first learning model being acquired by performing machine learning using images corresponding to the first image sensor, in the selecting, a second learning model is selected when the subject detection processing is applied to an image generated by a second image sensor, the second learning model being acquired by performing machine learning using images corresponding to the second image sensor, and the first image sensor and the second image sensor are provided in a same image capture apparatus.

14. A non-transitory computer-readable medium storing thereon a program for causing a computer to function as an image processing apparatus comprising:

a subject detection unit configured to apply subject detection processing to an image by using a learning model generated based on machine learning; and a selection unit configured to select, from learning models that are stored in a storage device for storing a plurality of learning models for use in the subject detection processing, a learning model to be used by the subject detection unit in accordance with characteristics of the image to which the subject detection processing is to be applied, wherein the selection unit selects a first learning model when applying the subject detection processing to an image generated by a first image sensor, the first learning model being acquired by performing machine learning using images corresponding to the first image sensor, the selection unit selects a second learning model when applying the subject detection processing to an image generated by a second image sensor, the second learning model being acquired by performing machine learning using images corresponding to the second image sensor, and the first image sensor and the second image sensor are provided in a same image capture apparatus.

15. A non-transitory computer-readable medium storing thereon a program for causing a computer included in an image capture apparatus to function as an image processing apparatus that is included in the image capture apparatus and comprises:

a subject detection unit configured to apply subject detection processing to an image by using a learning model generated based on machine learning; and a selection unit configured to select, from learning models that are stored in a storage device for storing a plurality of learning models for use in the subject detection processing, a learning model to be used by the subject detection unit in accordance with characteristics of the image to which the subject detection processing is to be applied, wherein the selection unit selects a first learning model when applying the subject detection processing to an image generated in a moving image shooting mode, the first learning model being acquired by performing machine learning using images corresponding to the moving image shooting mode, and the selection unit selects a second learning model when applying the subject detection processing to an image generated in a still image shooting mode, the second learning model being acquired by performing machine learning using images corresponding to the still image shooting mode.

16. A method executed by an image processing apparatus provided in an image capture apparatus comprising:

applying subject detection processing to an image by using a learning model generated based on machine learning; and selecting, from learning models that are stored in a storage device for storing a plurality of learning models for use in the subject detection processing, a learning model to be used by the subject detection unit in accordance with characteristics of the image to which the subject detection processing is to be applied, wherein in the selecting, a first learning model is selected when the subject detection processing is applied to an image generated in a moving image shooting mode, the first learning model being acquired by performing machine learning using images corresponding to the moving image shooting mode, and in the selecting, a second learning model is selected when the subject detection processing is applied to an image generated in a still image shooting mode, the second learning model being acquired by performing machine learning using images corresponding to the still image shooting mode.

17. An image processing method executed by an image processing apparatus, comprising:

applying subject detection processing to an image by using a learning model generated based on machine learning; and selecting, from learning models that are stored in a storage device for storing a plurality of learning models for use in the subject detection processing, a learning model to be used by the subject detection unit in accordance with characteristics of the image to which the subject detection processing is to be applied, wherein in the selecting, a first learning model is selected when the subject detection processing is applied to an image shot by using a first optical system, the first learning model being acquired by performing machine learning using images corresponding to the first optical system, in the selecting, a second learning model is selected when the subject detection processing is applied to an image shot by using a second optical system, the second learning model being acquired by performing machine learning using images corresponding to the second optical system, and the first optical system and the second optical system are used in a same image capture apparatus.

18. A non-transitory computer-readable medium storing thereon a program for causing a computer to function as an image processing apparatus comprising:

a subject detection unit configured to apply subject detection processing to an image by using a learning model generated based on machine learning; and a selection unit configured to select, from learning models that are stored in a storage device for storing a plurality of learning models for use in the subject detection processing, a learning model to be used by the subject detection unit in accordance with characteristics of the image to which the subject detection processing is to be applied, wherein the selection unit selects a first learning model when applying the subject detection processing to an image shot by using a first optical system, the first learning model being acquired by performing machine learning using images corresponding to the first optical system, the selection unit selects a second learning model when applying the subject detection processing to an image shot by using a second optical system, the second learning model being acquired by performing machine learning using images corresponding to the second optical system, and the first optical system and the second optical system are used in a same image capture apparatus.

* * * * *